United States Patent
Herron et al.

(10) Patent No.: US 7,061,916 B2
(45) Date of Patent: Jun. 13, 2006

(54) MECHANISM FOR UTILIZING VOICE PATH DMA IN PACKETIZED VOICE COMMUNICATION SYSTEM TO DECREASE LATENCY AND PROCESSOR OVERHEAD

(75) Inventors: Phillip Stone Herron, Huntsville, AL (US); Bruce Edward Mitchell, Madison, AL (US)

(73) Assignee: Adtran Inc., Huntsville, AL (US)

( * ) Notice: Subject to any disclaimer, the term of this patent is extended or adjusted under 35 U.S.C. 154(b) by 1017 days.

(21) Appl. No.: 10/095,380

(22) Filed: Mar. 12, 2002

(65) Prior Publication Data

US 2003/0174712 A1    Sep. 18, 2003

(51) Int. Cl.
*H04J 3/24* (2006.01)
*H04L 12/66* (2006.01)
*G06F 15/173* (2006.01)

(52) U.S. Cl. .............. 370/395; 370/352; 370/474; 709/224

(58) Field of Classification Search ........ 370/232–286, 370/328–356, 395–474; 709/212–224
See application file for complete search history.

(56) References Cited

U.S. PATENT DOCUMENTS

| | | | | |
|---|---|---|---|---|
| 5,615,214 A | * | 3/1997 | Chandos et al. ............ 370/349 |
| 6,324,188 B1 | * | 11/2001 | Tsuji ........................... 370/537 |
| 6,345,056 B1 | * | 2/2002 | Bharucha et al. ........... 370/474 |
| 6,600,759 B1 | * | 7/2003 | Wood .......................... 370/516 |
| 6,603,759 B1 | * | 8/2003 | Moskal et al. ............... 370/352 |
| 6,912,217 B1 | * | 6/2005 | Vogel .......................... 370/389 |
| 6,928,076 B1 | * | 8/2005 | Mehta et al. ................ 370/392 |
| 6,975,621 B1 | * | 12/2005 | Deshpande et al. ......... 370/352 |
| 2002/0163883 A1 | * | 11/2002 | Price ........................... 370/229 |
| 2003/0086378 A1 | * | 5/2003 | Chen et al. .................. 370/252 |
| 2003/0093513 A1 | * | 5/2003 | Hicks et al. ................. 709/224 |
| 2003/0161295 A1 | * | 8/2003 | Shah et al. .................. 370/352 |
| 2005/0141493 A1 | * | 6/2005 | Hardy et al. ................ 370/356 |

* cited by examiner

*Primary Examiner*—Man U. Phan
(74) *Attorney, Agent, or Firm*—Allen, Dyer, Doppelt, Milbrath & Gilchrist, P.A.

(57) ABSTRACT

A voice path direct memory access (DMA)-based packet generation mechanism writes digitally encoded voice samples directly into prescribed subportions of a preallocated portion of random access memory, to avoid interrupting a main processor for the purpose. A pointer to a respective buffer space subportion is presented to a protocol stack, so that one or more overhead bytes for the stored voice samples can be generated and written into adjacent address space of the preallocated portion of random access memory. The contents of the preallocated memory space are then serialized out for transmission to a destination receiver.

12 Claims, 2 Drawing Sheets

| HEADER | n BYTES OF DIGITALLY ENCODED VOICE SAMPLES | CHECKSUM |

| 4 BYTE ATM HEADER | 4 BYTE AAL2 HEADER | 44 BYTE VOICE SAMPLE |

MECHANISM FOR UTILIZING VOICE PATH DMA IN PACKETIZED VOICE COMMUNICATION SYSTEM TO DECREASE LATENCY AND PROCESSOR OVERHEAD

FIELD OF THE INVENTION

The present invention relates in general to communication systems and subsystems therefor, and is particularly directed to a voice path direct memory access (DMA)-based packet generation mechanism, that is operative to write digitally encoded voice samples directly into prescribed subportions of a preallocated portion of random access memory, to avoid interrupting the main processor core. A pointer to a respective buffer space subportion is presented to a protocol stack, so that one or more overhead bytes for the stored voice samples can be generated and written into adjacent address space of the preallocated portion of random access memory. The contents of the preallocated memory space are then serialized out for transmission to a destination receiver.

BACKGROUND OF THE INVENTION

The ability to conduct high-speed data communications between relatively remote data processing systems and associated subsystems is currently a principal requirement of a variety of industries and applications, such as business, educational, medical, financial and personal computer uses. Moreover, it can be expected that present and future applications of such communications will continue to engender more such systems and services. One technology that has attracted particular interest in the telecommunication community is digital subscriber line (DSL) service. DSL technology enables a public service telephone network (PSTN) to use existing telephone copper wiring infrastructure to deliver a relatively high data bandwidth digital communication service, that is selected in accordance with expected data transmission rate, the type and length of data transport medium, and schemes for encoding and decoding data.

FIG. 1 is a reduced complexity diagram of the general architecture of a DSL system, having a pair of mutually compatible digital communication transceivers 1 and 3 installed at remotely separated 'west' and 'east' sites 2 and 4, respectively, and coupled to a communication link 10, such as a twisted pair of an existing copper plant. One of these transceivers, for example, the west site transceiver 1, may be installed in a digital subscriber line access multiplexer (DSLAM) 6 of a network controller site (such as a telephone company central office (CO)). The DSLAM is coupled with an associated network backbone 5 that provides access to a number of information sources 7 and the Internet 8. As such, the west site transceiver 1 is used for the transport of digital communication signals, such as asynchronous transfer mode (ATM)-based packetized voice and data, from the west central office site 2 over the communication link 10 to an integrated access device (IAD), which serves as the DSL transceiver 3 at the east end of the link, and may be coupled with a computer 9 at a customer premises, such as a home or office.

For transporting data and voice, a network of the type shown in FIG. 1 may employ ATM Adaptation Layer 5 (AAL5) for data transport, and AAL2 for voice transport. As ATM is a 'cell'-based asynchronous transfer protocol, the digitally encoded voice samples must be packaged into properly formatted streams that incorporate correct header and packet or cell processing information, to ensure a continuous flow of voice and voice-band data cells across the ATM fabric. This requires that a prescribed number of digitally encoded voice samples be treated as a unit; the unit is processed in accordance with the appropriate protocol algorithms to produce associated auxiliary encapsulating components for the voice packet. These auxiliary components include headers, checksums, and the like, that are inserted into the data stream at the correct location (e.g., prepended headers, appended checksums) to realize a completely formatted packet stream, such as that shown in the reduced complexity example of FIG. 2.

Because the auxiliary components are derived from the digitally encoded voice samples, which can arrive at any time and have priority over data, it is necessary to buffer the voice samples and then perform the necessary processing to produce the proper auxiliary components that are to be prepended or appended to the digitally encoded voice sample data field to realize a ready for transmission packet, such as a fifty-three byte ATM cell.

One relatively straightforward approach to generating the overhead components would be to have the host processor pull all the voice samples one at a time from the communication coprocessor and then copy them from one buffer location to another, as it iteratively produces each auxiliary byte and assembles and restores these bytes along with the voice samples into successively larger groups, until the desired composite cell structure is eventually realized. Unfortunately, this unduly burdens the host processor and increases the latency of the system.

SUMMARY OF THE INVENTION

In accordance with the present invention, this problem is successfully resolved by a voice path DMA-based mechanism, that obviates the need to interrupt the main processor core, by writing digitally encoded voice samples directly into a first prescribed subportion of a preallocated portion of random access memory. In order to increase the data throughput capabilities of the system, the digitally encoded voice is preferably ADPCM-encoded to realize compressed voice representative data segments.

Once the last voice sample of a predetermined number n of incoming digitally encoded/compressed voice samples to be encapsulated in a transmission packet has been written into and thereby completes the filling of the first prescribed subportion of the preallocated buffer space, a pointer to this buffer space subportion is generated and presented to a protocol stack. In response to this pointer the processor generates one or more prescribed overhead bytes for the stored voice samples. In the case of an ATM cell used for [voice over ATM transmissions], such overhead bytes may include a four byte ATM Adaptation Layer 2 (AAL2) header and a four byte ATM header.

As these auxiliary bytes are generated they are written into a second prescribed sub-portion of the random access memory preallocated to the n number of (forty-four) digitally encoded voice samples. In addition, a 'ready-to-transmit' flag is asserted, so that the communication coprocessor can immediately read out the composite cell (headers plus voice sample data) for transmission. For the case of a fifty-three byte ATM cell, the serializing mechanism of the transmitter inserts a header error check or HEC byte to complete the fifty-three byte cell, as the fifty-two bytes (four ATM header, four AAL2 header, and forty-four voice) are serialized out from memory for transmission to a destination receiver.

DETAILED DESCRIPTION

Figures 1, 2, 4:
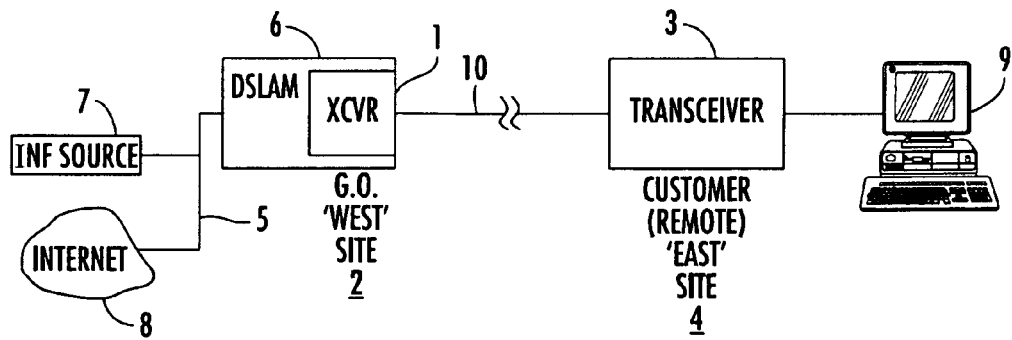
FIG. 1 is a reduced complexity diagram of the general architecture of a DSL telecommunication system.
FIG. 2 diagrammatically illustrates a reduced complexity example of packet stream containing header, data and checksum fields.
FIG. 4 shows an ATM voice packet data field prepended by four byte wide encapsulating ATM and AAL2 headers.

Before detailing the voice path direct memory access (DMA)-based packet generation mechanism of the present invention, it should be observed that the invention resides primarily in a prescribed arrangement of conventional communication hardware components and attendant supervisory communications microprocessor circuitry and application software therefor, that controls the operations of such components. In a practical implementation that facilitates its incorporation into telecommunication transceiver equipment (such as that which may be installed at a customer premises-associated integrated access device), the invention may be readily implemented using a general purpose digital computer, or field programmable gate array (FPGA)-configured, application specific integrated circuit (ASIC) chip sets. In terms of a practical hardware implementation of such chip sets, digital ASICs are preferred.

Consequently, the configuration of such subsystems and components and the manner in which they may be interfaced with a telecommunication wireline pair have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagrams of the Figures are primarily intended to show the major components in convenient functional groupings, so that the voice path direct memory access (DMA)-based packet generation mechanism of the present invention may be more readily understood.

Figure 3:
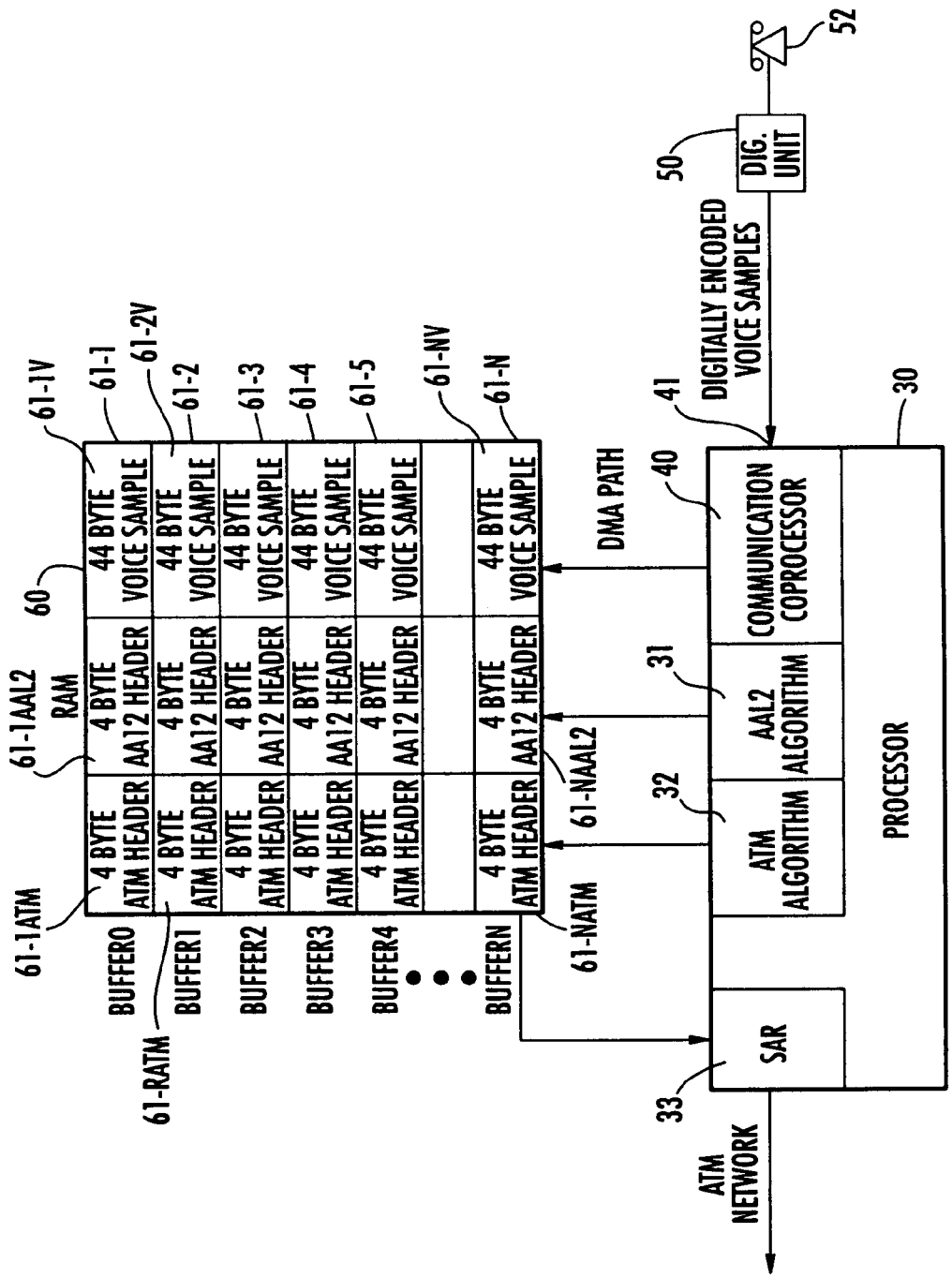
FIG. 3 diagrammatically illustrates an embodiment of the voice path direct memory access (DMA)-based packet generation mechanism of the invention.

Attention is now directed to FIG. 3, which diagrammatically illustrates an embodiment of the voice path direct memory access (DMA)-based packet generation mechanism of the invention for controlling the operation of a digital communication transceiver, such as an integrated access device, through which packetized encoded voice samples are assembled and transmitted over a digital communication network, such as that shown in FIG. 1 described above. In particular, FIG. 3 shows a control processor 30 having a communication co-processor 40, an input port 41 of which is coupled to receive digitally encoded voice samples serially supplied from an upstream digitizing unit 50, such as a codec coupled to an associated POTS phone 52, as a non-limiting example. (It can also be coupled to a B channel of an ISDN 7 U-chip or ST chip or 64 kbps stream from another interface such as a DSX-1.) As pointed out above, to increase the data throughput capabilities of the system, the digitally encoding unit 50 preferably ADPCM encodes the voice samples, so that encoded voice samples arrive as a compressed voice representative data stream at input coprocessor input port 41. As a non-limiting, but preferred example, the encoded voice samples may be compressed using ITU G.726 ADPCM compression.

In accordance with the invention, as successive digitally encoded and compressed voice samples are received by coprocessor 40, they are written under direct memory access (DMA) control into prescribed voice sample-storing subportions 61-$iv$ of respective preallocated portions 61-1, 61-2, . . . , 61-N of a random access memory (RAM) 60. As pointed out above, directly (DMA) writing the encoded voice samples into preallocated memory obviates having to interrupt the main processor core and thus eliminates unnecessary data field copying that leads to high latency and unnecessarily limits the processing time for other duties. The width of each respective voice sample-storing subportion 61-$iv$ is such as to accommodate a given number of bytes or words that will eventually form the data field of a respective packet. For the case of a fifty-three byte ATM cell, as a non-limiting example, the voice sample data field is forty-four bytes wide, so that each voice sample-storing subportion 61-$iv$ has a corresponding width of forty-four bytes.

For the present example of an ATM packet, the voice packet data field is prepended by a pair of four byte wide encapsulating headers, as shown in FIG. 4. To facilitate serial readout of a respective ATM cell from memory 60, as encoded voice samples are received from the codec they are (DMA-) written into the lower forty-four bytes of a respective fifty-two byte wide memory space 61-$i$ of memory 60, beginning with the ninth byte and continuing up to the fifty-second byte. Once a respective forty-four byte wide sub-portion 61-$iv$ of memory space 61-$i$ has been filled with encoded voice sample data bytes, a pointer to this buffer space subportion is presented to a protocol stack within the processor 30.

In response to this pointer, the processor executes one or more encapsulating algorithms, to derive one or more prescribed overhead bytes for the forty-four voice sample byte set. For the current example of the ATM cell of FIG. 4, processor 30 executes an AAL2 algorithm 31 on the compressed forty-four byte voice sample set in memory space 61-$iv$, to produce a first, four-byte wide AAL2 header, which is to be prepended to the forty-four voice sample bytes. These four AAL2 header bytes are written into a prescribed (four byte wide) sub-portion 61-$i$AAL2 of the fifty-two byte wide memory space 61-$i$, that is immediately adjacent to the forty-four byte wide memory address space 61-$iv$ containing the encoded voice sample bytes used to produce the wide AAL2 header. In addition, processor 30 executes an ATM algorithm 32 on the forty-eight bytes formed by these four prepended AAL2 header bytes and the forty-four voice sample bytes, to produce four additional encapsulating (ATM header) bytes that are written into a prescribed (four byte wide) sub-portion 61-$i$ATM of the fifty-two byte wide memory space 61-$i$, that is immediately adjacent to the four byte wide sub-portion 61-$i$AAL2 of fifty-two byte wide memory space 61-$i$.

Once the ATM and AAL2 encapsulating bytes have been generated and written into memory space 61-$i$, a 'ready-to-transmit' flag is asserted, in response to which the processor may proceed to immediately serialize out the contents of the fifty-two byte composite cell (headers plus voice sample data) stored in memory space 61-$i$ for transmission. For the present example of a fifty-three byte ATM cell, the processor's Segmentation And Reassembly Controller (SAR) 33 is configured to append an additional front end header error check or HEC byte to the ATM header 61-$i$ATM and thereby complete a respective fifty-three byte ATM cell, as the fifty-two bytes (four ATM header, four AAL2 header, and forty-four voice) are serialized out from memory space 61-*i* for transmission.

As will be appreciated from the foregoing description, because the voice path direct memory access (DMA)-based packet generation mechanism of the present invention writes digitally encoded voice samples directly into preallocated portions of random access memory as they are received, it avoids interrupting the main processor core, yet allows overhead bytes for the stored voice samples stored in memory to be readily generated and then placed into adjacent address space of the preallocated portion of random access memory, so that ATM cells may be serialized out from memory for transmission to a destination receiver.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. For use with a processor-controlled digital communication device coupled to receive a digitally encoded and compressed serial voice samples that are to be assembled into packets in accordance with an encapsulating protocol, for transmission over a digital communication link as a packetized voice output stream to a destination receiver device, a method for enabling said processor to assemble said packets comprising the steps of:
   (a) storing said digitally encoded and compressed voice samples via direct memory access into first subportions of a preallocated portion of memory, as said digitally encoded and compressed voice samples are received from an upstream source; and
   (b) in response to a first subportion of a respective preallocated portion of said memory containing a predetermined number of said digitally encoded and compressed voice samples as stored therein in step (a), processing said predetermined number of said digitally encoded and compressed voice samples, to derive one or more overhead fields in accordance with said encapsulating protocol, and storing said one or more overhead fields into a second subportion of said respective preallocated portion of memory associated with said first subportion of said respective preallocated portion of said memory.

2. The method according to claim 1, further comprising the step (c) of reading out contents of said first and second subportions of said respective preallocated portion of memory as said packetized voice output stream for transmission to said destination receiver device.

3. The method according to claim 1, wherein said first subportion of said respective preallocated portion of memory has a first storage capacity corresponding to said predetermined number of said digitally encoded and compressed voice samples, and wherein said second subportion of said respective preallocated portion of memory has a second storage capacity corresponding to the total code width of said one or more overhead fields.

4. The method according to claim 3, wherein said packets comprise asynchronous transfer mode (ATM) voice packets, and wherein said encapsulating protocol includes an ATM Adaptation Layer 2 (AAL2) header overhead field derived in accordance with said predetermined number of said digitally encoded and compressed voice samples, and an ATM header overhead field derived in accordance with said AAL2 header and said predetermined number of said digitally encoded and compressed voice samples.

5. The method according to claim 4, wherein said predetermined number of said digitally encoded and compressed voice samples corresponds to forty-four digitally encoded and compressed voice sample bytes, and wherein each of said AAL2 and ATM headers is a four byte header.

6. The method according to claim 5, further comprising the step (c) of reading out contents of said first and second subportions of said respective preallocated portion of memory to produce a fifty-two byte serialized stream containing said four byte AAL2 and ATM headers prepended to said forty-four digitally encoded and compressed voice sample bytes, and inserts a header error check byte to said fifty-two byte serialized stream to realize a fifty-three byte ATM voice packet.

7. An arrangement for enabling a processor-controlled digital communication device to assemble digitally encoded and compressed serial voice samples into packets in accordance with an encapsulating protocol, so that said packets may be transmitted over a digital communication link as a packetized voice output stream to a destination receiver device, comprising:
   a direct memory access-based storage unit, which is operative to store said digitally encoded and compressed voice samples into first subportions of a preallocated portion of memory, as said digitally encoded and compressed voice samples are received from an upstream source; and
   an encapsulation operator executed in said processor and being operative, in response to a first subportion of a respective preallocated portion of said memory containing a predetermined number of said digitally encoded and compressed voice samples, to process said predetermined number of said digitally encoded and compressed voice samples, and thereby derive one or more overhead fields in accordance with said encapsulating protocol, and to store said one or more overhead fields into a second subportion of said respective preallocated portion of memory associated with said first subportion of said respective preallocated portion of said memory.

8. The arrangement according to claim 7, wherein said processor is operative to read out contents of said first and second subportions of said respective preallocated portion of memory as said packetized voice output stream for transmission to said destination receiver device.

9. The arrangement according to claim 7, wherein said first subportion of said respective preallocated portion of memory has a first storage capacity corresponding to said predetermined number of said digitally encoded and compressed voice samples, and wherein said second subportion of said respective preallocated portion of memory has a second storage capacity corresponding to the total code width of said one or more overhead fields.

10. The arrangement according to claim 9, wherein said packets comprise asynchronous transfer mode (ATM) voice packets, and wherein said encapsulating protocol includes an ATM Adaptation Layer 2 (AAL2) header overhead field derived in accordance with said predetermined number of said digitally encoded and compressed voice samples, and an ATM header overhead field derived in accordance with said AAL2 header and said predetermined number of said digitally encoded and compressed voice samples.

11. The arrangement according to claim 10, wherein said predetermined number of said digitally encoded and compressed voice samples corresponds to forty-four digitally encoded and compressed voice sample bytes, and wherein each of said AAL2 and ATM headers is a four byte header.

12. The arrangement according to claim 11, wherein said processor is operative to read out contents of said first and second subportions of said respective preallocated portion of said memory to produce a fifty-two byte serialized stream containing said four byte AAL2 and ATM headers prepended to said forty-four digitally encoded and compressed voice sample bytes, and to insert a header error check byte to said fifty-two byte serialized stream to realize a fifty-three byte ATM voice packet.

* * * * *